US011454702B2

(12) United States Patent
Krieger et al.

(10) Patent No.: US 11,454,702 B2
(45) Date of Patent: Sep. 27, 2022

(54) SYNTHETIC APERTURE RADAR METHOD AND SYNTHETIC APERTURE RADAR DEVICE

(71) Applicant: Deutsches Zentrum für Luft—und Raumfahrt e. V., Bonn (DE)

(72) Inventors: Gerhard Krieger, Gauting (DE); Sigurd Huber, Munich (DE); Patrick Klenk, Germering (DE); Alberto Moreira, Olching (DE); Felipe Queiroz De Almeida, Munich (DE); Jens Reimann, Germering (DE); Michelangelo Villano, Gilching (DE); Marwan Younis, Weßling (DE)

(73) Assignee: DEUTSCHES ZENTRUM FÜR LUFT- UND RAUMFAHRT E. V., Bonn (DE)

( * ) Notice: Subject to any disclaimer, the term of this patent is extended or adjusted under 35 U.S.C. 154(b) by 206 days.

(21) Appl. No.: 17/058,522

(22) PCT Filed: Apr. 25, 2019

(86) PCT No.: PCT/EP2019/060608
§ 371 (c)(1),
(2) Date: Nov. 24, 2020

(87) PCT Pub. No.: WO2019/228716
PCT Pub. Date: Dec. 5, 2019

(65) Prior Publication Data
US 2021/0215795 A1    Jul. 15, 2021

(30) Foreign Application Priority Data

May 28, 2018 (DE) .......................... 102018208366.5

(51) Int. Cl.
*G01S 7/40* (2006.01)
*G01S 13/90* (2006.01)

(52) U.S. Cl.
CPC ........ *G01S 7/4034* (2021.05); *G01S 13/9056* (2019.05)

(58) Field of Classification Search
CPC ... G01S 13/9056; G01S 7/4026; G01S 7/4034
See application file for complete search history.

(56) References Cited

U.S. PATENT DOCUMENTS

2009/0109086 A1* 4/2009 Krieger ................. G01S 13/904
342/25 F

OTHER PUBLICATIONS

International Search Report issued in corresponding PCT Application No. PCT/EP2019/060608, dated Jul. 4, 2019, pp. 1-2.

(Continued)

*Primary Examiner* — Timothy A Brainard
(74) *Attorney, Agent, or Firm* — Carter, DeLuca & Farrell LLP

(57) ABSTRACT

A synthetic aperture radar method for remote sensing of the surface of the Earth by means of a radar device on a flying object moving in an azimuth direction above the surface of the Earth, wherein the radar device includes an array of antenna elements for transmitting radar pulses in a transmitting operation and for receiving radar echoes of these radar pulses reflected at the surface of the Earth in a receiving operation. A calibration mode is carried out in which
  the transmission of the radar pulses in the transmitting operation is carried out with a pulse repetition rate such that only echo signals of a single radar echo are received by all antenna elements of the array at the same point in time in the receiving operation;
  in the receiving operation, the echo signals are recorded in a plurality of receiving channels, wherein a different antenna element is assigned to a respective receiving channel, and in the respective receiving channel the echo signals received by the assigned antenna element are digitized and directly stored, thereby obtaining digitized radar data;
  the digitized radar data are further processed to determine a set of calibrated parameters of the radar device for the SAR operating mode for obtaining SAR images.

14 Claims, 2 Drawing Sheets

(56) References Cited

OTHER PUBLICATIONS

Krieger, G. et al., "CEBRAS: Cross elevation beam range ambiguity suppression for high-resolution wide-swath and MIMO-SAR imaging" 2015 IEEE International Geoscience and Remote Sensing Symposium (IGARSS) (Jul. 2015) pp. 196-199.

Villano, M. et al., "Staggered SAR: Performance Analysis and Experiments With Real Data " IEEE Transactions on Geoscience and Remote Sensing (Nov. 2017) pp. 6617-6638, vol. 55, No. 11.

Queiroz De Almeida, F. et al., "Multichannel staggered SAR with reflector antennas: Discussion and proof of concept" 18th International Radar Symposium (IRS) (Jun. 2017) pp. 1-10.

Krieger, G. et al., "Advanced synthetic aperture radar based on digital beamfomning and waveform diversity" Radar Conference, Radar '08. IEEE (May 2008) pp. 1-6.

Bordoni, F. et al., "Calibration Error Model for Multichannel Spaceborne SAR Systems Based on Digital Beamforming" Proceedings of the 10th European Radar Conference (Oct. 2013) pp. 184-187.

\* cited by examiner

SYNTHETIC APERTURE RADAR METHOD AND SYNTHETIC APERTURE RADAR DEVICE

CROSS REFERENCE TO RELATED APPLICATIONS

This application is a national phase of PCT Application No. PCT/EP2019/060608 filed on Apr. 25, 2019, which claims the benefit of and priority to German Patent Application No. 10 2018 208 366.5, filed on May 28, 2018, each of which are hereby incorporated by reference herein in their entirety.

TECHNICAL FIELD

The present disclosure relates to a synthetic aperture radar method for remote sensing of the surface of the Earth and a corresponding synthetic aperture radar device.

BACKGROUND INFORMATION

Synthetic aperture radar methods, also denoted by SAR methods, enable remote sensing of the surface of the Earth by detecting radar pulses reflected at the surface of the Earth and emitted by a radar device which moves at a constant speed above the surface of the Earth in a so-called azimuth direction. The term surface of the Earth is to be understood in a broad sense and may also refer to the surface of a celestial body (preferably of a planet) other than the Earth.

With SAR radar methods, it is taken advantage of the finding that, due to the moving radar device, the same areas of the Earth or of a celestial body are detected in different positions, so that amplitude and phase information and finally a radar image of the surface of the earth can be obtained. Thus, a synthetic aperture in the azimuth direction is generated.

The radar echoes received by an SAR system are converted into digital SAR raw data, which, for a large number of the transmitted radar pulses correlating with corresponding azimuth positions, each contain data samples for a plurality of so-called range positions, which represent different distances between the surface of the Earth and the azimuth direction and therefore represent radar echoes from different directions. The range positions can be given as so-called slant-range (oblique distance) or as so-called ground-range (ground distance). The slant-range corresponds to the distance of the radar device from the surface of the Earth in the direction from which a radar echo is received. The ground range corresponds to the projection of the slant-range on the surface of the Earth. Both values can be converted into each other.

For ensuring the detection of a wide strip of the surface of the Earth with good azimuth resolution, so-called multi-beam SAR systems are known in the state of the art. These systems comprise as the radar device a planar antenna having a plurality of antenna elements or a reflector antenna having an array of feed antenna elements (also called feed array). In this way, radar echoes of different radar pulses received simultaneously from the surface of the Earth from different directions can be separated. For this purpose, digital beamforming in elevation (i.e. laterally inclined downwards at about 900 with respect to the flight direction) is used. By means of this digital beamforming, the radar echoes of different pulses are recorded with a plurality of receiving lobes or beams. The digital beamforming is carried out after digitalization of the received radar echoes and provides the SAR raw data mentioned above.

In order to obtain high-quality images of the surface of the Earth, SAR radar systems or their radar devices must be calibrated appropriately. This is especially necessary for the multi-beam SAR systems described above to ensure that by digital beamforming, actually beams are obtained that include only the radar echo of a single radar pulse. For the appropriate calibration of SAR radar systems, a comprehensive characterization of the far field of the antenna systems used is necessary. A measurement of the far field on the ground is often not possible, because SAR radar systems with long radar wavelengths are increasingly used, which leads to large dimensions of the antenna systems. This is especially true for reflector systems whose reflector is only unfold in space.

It is also known from the state of the art to perform the calibration of SAR radar systems in orbit using dedicated calibration targets on the ground, such as corner reflectors or transponders. However, this requires a very large number of calibration targets in order to characterize the shape of the electric far field emitted by the antenna system with sufficient accuracy. Therefore, this calibration method is often not feasible.

In addition, it is known to describe the far field of SAR antenna systems by means of a suitable antenna model without explicitly performing calibration measurements. However, this requires highly accurate information on flight attitude and shape of the components of the antenna system (e.g. of a reflector) in space, which is often not available.

Therefore, it is the object of the present disclosure to provide a synthetic aperture radar method and a synthetic aperture radar device, which allow easy calibration of the used radar device in orbit.

This object is achieved by the method according to claim 1 or the device according to claim 13, respectively. Further embodiments of the present disclosure are defined in the dependent claims.

SUMMARY

The synthetic aperture radar method according to the-present disclosure is used for remote sensing of the surface of the Earth by means of a radar device on a flying object moving in an azimuth direction above the surface of the Earth, wherein the radar device comprises an array of antenna elements for transmitting radar pulses in a transmitting operation and for receiving radar echoes of these radar pulses reflected at the surface of the Earth in a receiving operation. The antenna diagrams of the respective antenna elements describe both the transmission and the reception of radar radiation. The radar equipment is configured such that in an SAR normal operating mode, in which SAR images are obtained, a plurality of radar echoes from different radar pulses are received simultaneously and separated from each other by means of digital beamforming. The radar device thus comprises not only the antenna elements but also a processing device for carrying out the digital beamforming. From the data obtained by digital beamforming, finally SAR images are obtained in the SAR normal operating mode, wherein the calculation of SAR images does not necessarily have to be performed by the processing device contained in the radar device, but can also take place at a ground station on the surface of the Earth. In the latter case, the data obtained by the digital beamforming are transmitted to the ground station for further processing.

In accordance with the present disclosure, with the synthetic aperture radar method a calibration mode is carried out that is different from the SAR normal operating mode mentioned above. In this calibration mode, the radar pulses are transmitted in the transmitting operation at a predetermined (constant) pulse repetition rate, so that only echo signals of a single radar echo are received by all antenna elements of the array at the same point in time in the receiving operation. Thus, at any corresponding reception time, no radar echoes from different radar pulses arrive at the array. Preferably, one antenna element is a single antenna radiator. However, an antenna element can also be formed from a plurality of antenna radiators, provided that these are hard-wired to each other and cannot be controlled separately. In a preferred option, as a radar device a reflector antenna is used, which comprises a parabolic reflector and an array of feed antenna elements. Nevertheless, the present disclosure is also applicable to a planar antenna comprising a plurality of antenna elements in a planar array.

In the receiving operation of the calibration mode according to the present disclosure, the echo signals are recorded in a plurality of receiving channels, wherein a different antenna element is assigned to a respective receiving channel and, preferably, a receiving channel is present for each antenna element (i.e. each antenna element is activated for receiving radar radiation). In the respective receiving channel, the echo signals received by the assigned antenna element are digitized and stored directly, i.e. without the interposition of digital beamforming, independently of the other receiving channels, thereby obtaining digitized radar data for each receiving channel. The incoming radar echoes are thus detected transparently for the respective antenna elements. The above mentioned term storing is to be understood such that the digitized radar data are available for further processing by other data processing methods. It is thus not a matter of short-term storage within the signal flow of data processing.

The digitized radar data of the respective receiving channels are then further processed to determine a set of calibrated parameters of the radar device for the SAR normal operating mode defined above, i.e. for an SAR operating mode that does not serve the purpose of calibration.

According to example embodiments, a method according to the present disclosure is based on the finding that the transparent detection of radar signals by individual antenna elements without digital beamforming and without range ambiguities allows an extraction of calibrated parameters without the need to provide dedicated calibration targets on the surface of the Earth. In particular, with the method according to the present disclosure, information on the relative antenna diagrams of the individual antenna elements can be derived and used for calibration.

According to example embodiments of the present disclosure, all antenna elements of the array simultaneously transmit radar radiation at the predetermined pulse repetition rate during the transmitting operation, wherein the predetermined pulse repetition rate is reduced in comparison to the pulse repetition rate of the SAR normal operating mode, so that radar echoes of different radar pulses never arrive simultaneously at the array. In this way, a low pulse repetition rate ensures that only a single radar echo is received in the receiving operation at any time. In some example embodiments of the present disclosure, only the pulse repetition rate is changed in the calibration mode in comparison to the SAR normal operating mode, whereas the radiation characteristics of the radar device remain unchanged in comparison to the SAR normal operating mode.

According to example embodiments, at any time of transmission, radar radiation is directed via the radar device to a smaller area of the surface of the Earth than in the SAR normal operating mode, so that radar echoes of different radar pulses never arrive simultaneously at the array of antenna elements. This embodiment has the advantage that a higher pulse repetition rate can be used, thus avoiding azimuth ambiguities in the received radar echoes. In case the array of antenna elements is part of a reflector antenna, the illumination of the reduced area on the surface of the Earth is preferably achieved by using only a subset of the antenna elements of the array to emit radar radiation. In case the array of antenna elements is a planar array, the illumination of the reduced area is preferably achieved by a suitable adjustment of the phase offset between the antenna elements. Optionally, for a planar array, the reduced area can also be achieved by using more antenna elements to emit radar radiation than in the SAR normal operating mode, resulting in a larger aperture and thus a narrower radiation lobe. According to example embodiments of the present disclosure, only the radiation characteristics of the radar device are changed in the calibration mode compared to the SAR normal operating mode, whereas the pulse repetition rate remains unchanged compared to the SAR normal operating mode.

According to example embodiments of the method according to the present disclosure, the digitized radar data of each receiving channel for the radar echo of a respective radar pulse are subjected to range compression during further processing, thereby obtaining a plurality of digital radar signals for the respective radar pulse, wherein for the corresponding radar echo at least one digital radar signal for a respective range position out of a plurality of range positions is present. A plurality of digital radar signals for a respective range position are thereby obtained if, in addition to range compression, also a decomposition in the Doppler frequency spectrum of the radar echo is carried out, as explained further below. The range positions represent positions in the range direction extending perpendicular to the azimuth direction in a manner known per se.

According to example embodiments, the digitized radar data of a respective receiving channel for the radar echo of a respective radar pulse are subjected to a range compression without also carrying out a frequency decomposition of the digitized radar data in the Doppler frequency spectrum of the radar echo, wherein the Doppler frequency spectrum is caused by the movement of the flying object in the azimuth direction. In this way, for a respective range position a single digital radar signal is obtained for the corresponding radar echo. This modification is preferably used whenever the simultaneous reception of a plurality of radar echoes is prevented only by a low pulse repetition rate. In this case, a decomposition in the Doppler frequency spectrum is not useful due to azimuth ambiguities.

In an alternative embodiment, the digitized radar data of a respective receiving channel for the radar echo of a respective radar pulse are subjected to a range compression, wherein additionally a frequency decomposition of the digitized radar data in the Doppler frequency spectrum of the radar echo is carried out, thereby obtaining for a respective range position a plurality of digital radar signals at different Doppler frequencies (i.e. different azimuth angles) for the corresponding radar echo.

According to example embodiments of the method according to the-present disclosure, the set of calibrated parameters comprises coefficients for combining received echo signals of the individual antenna elements during the digital beamforming in the SAR normal operating mode for obtaining SAR images. Thus, calibration is used to determine suitable coefficients for the subsequent digital beamforming carried out by the radar device.

According to example embodiments, during the determination of the calibrated coefficients for a plurality of range positions at least one covariance matrix is determined, the entries of which are assigned to pairwise combinations of receiving channels, wherein the entries of the covariance matrix are obtained by summing over the radar echoes from a plurality of radar pulses the product of two digital radar signals for the receiving channels of the pairwise combination assigned to the respective entry. In the case that the digital radar signals were obtained by means of a range compression without frequency decomposition in the Doppler frequency spectrum, there is only one covariance matrix for a respective range position. Otherwise, there are a plurality of covariance matrices for different Doppler frequencies.

According to the above embodiment, the entries of the complex-conjugate of the eigenvector of the covariance matrix having the largest eigenvalue are used as weights to combine the digital radar signals for the radar echo of a respective radar pulse in a respective range position, thereby obtaining a digital target radar signal based on which the calibrated coefficients of the digital beamforming are determined. For this determination a Wiener beamformer known per se is used, as explained in detail in the detailed description.

According to example embodiments, in addition to the digital target radar signal, for each receiving channel a corrupted signal is calculated, in which range ambiguities due to the simultaneous reception of radar echoes of different radar pulses are modelled by superimposing time-shifted copies of digital radar signals of the respective receiving channel, wherein the calibrated coefficients of the digital beamforming are weights of a weighted sum of the corrupted signals of all receiving channels and are determined by means of an optimization with the optimization objective of a smallest possible difference between the digital target radar signal and the weighted sum. Preferably, this optimization is the minimization of a difference (preferably the difference in magnitude or the mean square error) between the digital target radar signal and the weighted sum.

According to example embodiments of the method according to the present disclosure, at least one set of weights is calculated for a respective range position, wherein the weights of a respective set describe the relative ratio of the digital radar signals of the different antenna elements of the array to one another. The at least one set of weights is determined in particular by means of a cross-correlation of digital radar signals of different antenna elements, as explained in more detail in the detailed description. In case the digital radar signals are determined by means of a range compression without frequency decomposition in the Doppler frequency spectrum, there is only one set of weights in a respective range position. Otherwise there are a plurality of sets of weights in the respective range position for different Doppler frequencies. Based on the at least one set of weights, the calibrated coefficients of the digital beamforming are subsequently determined. The weights can easily be used by a conventional algorithm for determining coefficients for digital beamforming.

According to example embodiments, the SAR normal operating mode uses radar pulses with a predetermined bandwidth to obtain SAR images for which the set of calibrated parameters is determined, wherein the bandwidth of the radar pulses in the calibration mode is less than the predetermined bandwidth. This takes into account the fact that the amount of data acquired in the calibration mode is substantially larger than in the regular SAR operating mode due to the recording of radar data for each antenna element. In order to ensure storage anyway, the bandwidth of the radar pulses in calibration mode is reduced so that sampling can be performed at a lower sampling rate according to the sampling criterion.

According to example embodiments of the present disclosure, the digitized radar data are transmitted from the flying object to a ground station on the surface of the Earth for further processing, where the set of calibrated parameters is determined. This takes into account that the computing power for determining the calibrated parameters is usually limited in the flying object.

In addition to the method described above, the present disclosure relates to a synthetic aperture radar device for remote sensing of the surface of the Earth, comprising a radar device on a flying object moving in an azimuth direction above the surface of the Earth during operation of the synthetic aperture radar device, wherein the radar device comprises an array of antenna elements to transmit radar pulses in a transmitting operation and to receive the radar echoes of these radar pulses reflected on the surface of the Earth in a receiving operation, wherein the radar device is configured such that in an SAR normal operating mode for obtaining SAR images, a plurality of radar echoes from different radar pulses are received simultaneously and are separated from one another by means of digital beamforming. The synthetic aperture radar device is adapted to carry out a calibration mode according to the method of the present disclosure or of one or more example embodiments of the method according to the present disclosure.

The present disclosure further relates to a method for operating a radar device, wherein the radar device carries out the transmitting and receiving operations of the synthetic aperture radar method according to the present disclosure or of one or more example embodiments of this method. In other words, this method comprises all the steps of the synthetic aperture radar method according to the present disclosure, except for the further processing of the digitized radar data to determine calibrated parameters.

The present disclosure further relates to a radar device, wherein the radar device is configured to carry out the above operating method.

BRIEF DESCRIPTION OF THE DRAWINGS

In the following, exemplary embodiments of the present disclosure are described in detail on the basis of the attached figures, in which.

DETAILED DESCRIPTION

Figure 1:
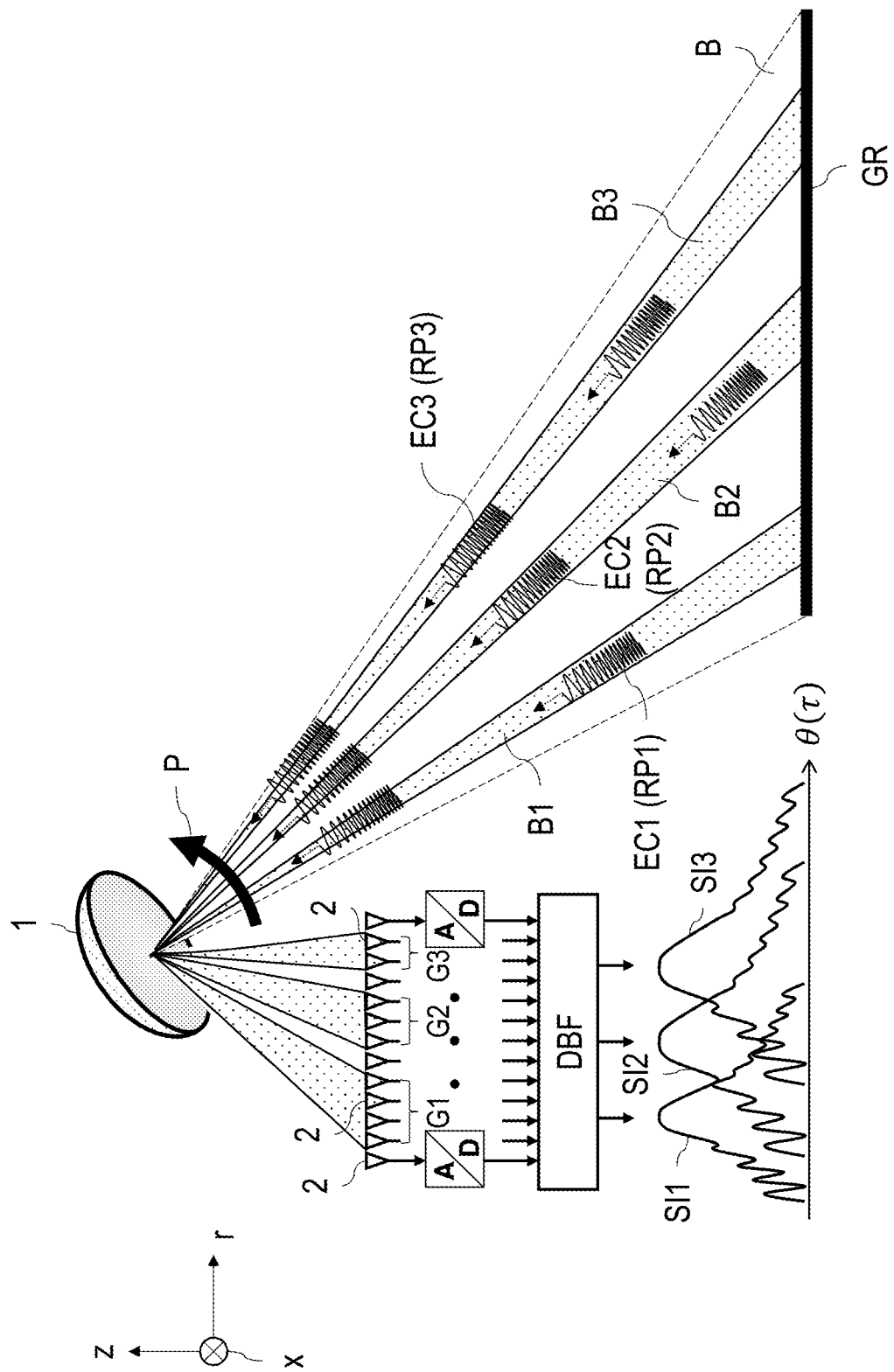
FIG. 1 is a schematic illustration of an SAR operating mode with digital beamforming, wherein the coefficients of the digital beamforming are determined on the basis of an embodiment of the method according to an example embodiment of the present disclosure.

In the following, the presently disclosed synthetic aperture radar is described by means of a synthetic aperture radar system, the structure of which is schematically shown in FIG. 1. The radar system comprises a radar device in the form of a reflector antenna, which comprises a reflector 1 as well as a so-called feed array having a plurality of antenna elements or antenna radiators 2, which are only partially designated with this reference sign. The radar device is located on a flying object (not shown), such as a satellite, which moves at a constant speed in the azimuth direction x above the surface of the Earth, wherein the surface of the Earth is designated with the reference sign GR. By means of a corresponding coordinate system, the range direction r and the elevation direction z are indicated in FIG. 1 in addition to the azimuth direction x. Antenna elements 2 of the array simultaneously emit radar radiation at a given pulse repetition rate, whereby a radar pulse illuminates a strip on the surface of the Earth at repeated intervals. The spatial region of the emitted radar pulse is marked with reference sign B in FIG. 1 and is limited by two dashed lines. The respective radar pulses are reflected at the surface of the Earth and the resulting radar echoes are detected again by antenna elements 2 of the radar device. By suitable signal processing of the detected radar echoes, images of the surface of the Earth can then be obtained.

In the scenario in FIG. 1 the well-known SAR operating mode "scan-on-receive" is shown, which enables the detection of a wide strip on the surface of the Earth in the range direction r. The problem here is that at any given time of reception, a plurality of radar echoes from different radar pulses are received simultaneously and must be separated. In FIG. 1, corresponding radar echoes are indicated by separate waveforms having directional arrows towards reflector 1 which are coupled to them. As an example, three radar echoes, which are received simultaneously, are marked with reference signs EC1, EC2 and EC3. Each radar echo belongs to a different radar pulse. Echo EC1 was caused by radar pulse RP1, echo EC2 by radar pulse RP2 and echo EC3 by radar pulse RP3. Radar pulse RP1 was transmitted at a later time than radar pulse RP2 and radar pulse RP2 at a later time than radar pulse RP3.

To separate the radar echoes, the SAR radar system uses a so-called digital beamforming, which is designated with DBF in FIG. 1. During this digital beamforming, first the individual echo signals of antenna elements 2 are digitized, for which A/D converters are used which are assigned to the individual antenna elements. Then the digitized signals are combined such that groups of antenna elements form so-called beams, which are each assigned to the radar echo of a single radar pulse and substantially only receive the assigned radar echo. The respective beams follow the propagation of the corresponding radar echo, which is indicated by arrow P in FIG. 1.

FIG. 1 shows an example of a digital beamforming, in which three beams B1, B2 and B3 are used. The beams each have a different elevation, wherein the elevation represents the inclination with respect to the surface of the Earth GR in the r-z-plane of the coordinate system shown. At the point in time currently shown in FIG. 1, beam B1 is generated by group G1 of antenna elements, beam B2 by group G2 of antenna elements and beam B3 by group G3 of antenna elements.

After carrying out the digital beamforming, separate signals SI1, SI2 and SI3 are finally obtained, which belong to respective beams B1, B2 and B3. The signals always contain only the radar echo of a single radar pulse. In FIG. 1, the signals are plotted over the elevation angle θ, which changes as a function of time τ, wherein this time correlates with the range position.

Various methods for digital beamforming are known from the state of the art. It is the object of these methods to maximize the antenna gain in the direction of the desired radar echo to be received, and at the same time to minimize the gain of the antenna in directions from which a different radar echo is received at the same time. To achieve this, a precise knowledge of the amplitude and phase of the antenna radiation patterns of the individual antenna elements is required. This information can often not be determined with sufficient accuracy in advance on the ground for a corresponding radar installation of an SAR system. Consequently, this information is determined by means of suitable antenna models or, if necessary, by calibration which, however, requires the detection of dedicated calibration targets, such as corner reflectors or transponders, on the surface of the Earth.

According to the present disclosure, a novel calibration is provided, which is used to obtain the knowledge about the amplitude and phase of the antenna radiation patterns of the antenna elements in a special calibration mode of the SAR system already in orbit, without requiring any measurement of calibration targets on the surface of the Earth.

In the following, two embodiments of the calibration according to the present disclosure are described, which are called the first calibration mode and the second calibration mode. In the first calibration mode, the radar pulses are emitted by the radar device at a very low pulse repetition rate. This pulse repetition rate is significantly lower than the pulse repetition rate of the operating mode shown in FIG. 1. In particular, the pulse repetition rate is selected such that only a single radar echo is received by the array of antenna elements 2 at any given time of reception. Analogous to the operating mode shown in FIG. 1, a wide strip on the surface of the Earth is detected by all antenna elements emitting radar radiation at the corresponding transmission times to generate a radar pulse.

In the first calibration mode, the echo signals from each antenna element of the array are digitized and stored independently of the other antenna elements directly, i.e. without using digital beamforming. Thus, for each antenna element a receiving or elevation channel with correspondingly assigned digitized radar data is created. The digitized radar data are then transmitted to a ground station (not shown), where corresponding calibrated coefficients for the digital beamforming DBF are determined. These coefficients are then sent to the SAR system in orbit so that digital beamforming can be carried out there with the calibrated coefficients.

When transmitting the digitized radar data to the ground station, there is the problem that due to the large amount of data generated, the transmission capacity for transmitting the data to the surface of the Earth is not sufficient. The high amount of data is due to the fact that data is collected for each antenna element, which is not the case in the operating mode of FIG. 1, where a plurality of antenna elements are combined to form corresponding beams. To solve this problem, in the first calibration mode and analogously also in the second calibration mode described further below, a radar pulse having a smaller bandwidth than in the SAR operation of FIG. 1 is used. For example, for the Tandem-L mission in an operating mode that generates five beams by means of digital beamforming, a bandwidth of 84 MHz is provided for the radar pulses. This bandwidth can be reduced to 10 MHz in the corresponding calibration mode, for example, wherein the full frequency range of 84 MHz can be detected by successive measurement cycles and any frequency dependencies can be measured. With a reflector antenna having 35 antenna elements used in this mission, the signals from all antenna elements can then be recorded, since the reduced bandwidth in accordance with the sampling theorem allows a lower sampling rate.

During the further processing of the digitized radar data transmitted to the ground station, a range compression known per se is first carried out for the radar data of the individual elevation channels. By means of the range compression, the signal-to-noise ratio of the signal is maximized and the scattering point on the surface of the Earth is located at the correct range position. With the range compression digital radar signals are obtained which provide amplitude and phase values for a given radar pulse and a respective range position. In the following, these radar signals are designated with $u_i(t_k; r)$. The index i specifies one antenna element out of the array. The point in time $t_k$ specifies the reception of the radar echo of the kth pulse and r denotes a corresponding range position. These radar signals have no range ambiguities due to the data acquisition with low pulse repetition rate.

In a next step, the obtained radar signals are used to estimate the following covariance matrix for each range position:

$$R_{ij}(r)=E[u_i(t_k;r)u_j^*(t_k;r)]$$

The expectancy value operator E[ ] is represented by a sum of a plurality of successive radar pulses or their echoes (i.e. a sum over time points $t_k$). For this matrix, weights are then determined which are the entries of the complex-conjugate of the eigenvector with the maximum eigenvalue of the covariance matrix $R_{ij}(r)$. Thus, a corresponding weight is obtained for each antenna element. The radar signals $u_i(t_k;r)$ of the individual antenna elements are then multiplied by the assigned weights and added together. In this way, a target radar signal $u_d(t_k; r)$ is obtained for each range position r, which exhibits no range ambiguities due to the data acquisition with low pulse repetition rate. Furthermore, for each elevation channel a corrupted signal $u_{c,i}(t_k; r)$ is modelled which contains range ambiguities. The modelling is achieved by a linear superposition of the above radar signals $u_i(t_k; r)$ as follows:

$$u_{c,i}(t_k;r) = u_i(t_k;r) + \sum_m a_m u_i(t_k; r - r_m)$$

Here, $r_m$ denotes the range position with the range ambiguity m, wherein the ambiguities are numbered accordingly. Furthermore, a scaling factor $a_m$ is introduced to take into account a backscatter difference between the target signal and the respective ambiguous signals. The scaling factor is determined taking into account previously known scattering properties of the surface of the Earth where the radar radiation is currently reflected. A suitable determination of the scaling factor lies within the capabilities of a person skilled in the art.

In a next step, the mean square error between the target radar signal $u_d(t_k; r)$ and a weighted superposition of the corrupted signals $u_{c,i}(t_k;r)$ is finally minimized. This is achieved by the Wiener-Beamformer, which is known per se. The weights are derived by multiplying the covariance matrix of the corrupted signals with a vector obtained by correlating the corrupted signals of the individual antenna elements with the target radar signal. The weights obtained represent calibrated coefficients which are then used in the operation of the SAR radar system for the weighted combination of the signals received by the antenna elements in a digital beamforming process. Thus, a high quality beamforming with good suppression of range ambiguities is achieved.

Since a low pulse repetition rate is used in the first calibration mode, a resolution of the radar signals cannot be achieved in the azimuth direction due to the occurrence of azimuth ambiguities. However, a resolution of the radar signals in the azimuth direction is enabled by the second calibration mode described below. In contrast to the first calibration mode, this calibration mode uses a higher pulse repetition rate so that range ambiguities would occur if the respective radar pulses were generated by the radar radiation from all antenna elements of the array.

The range ambiguities are now avoided by the fact that only a subset of the antenna elements of the array transmits radar radiation at any respective point in time to generate a radar pulse. As a result, a strip with a reduced width in the range direction is illuminated, which leads to the suppression of range ambiguities. By activating different subsets of antenna elements, it is also possible to detect different strips with reduced width, and thus, to obtain data for a strip that corresponds to an illumination with all antenna elements of the array. By using the higher pulse repetition rate, azimuth ambiguities are avoided, so that information for different azimuth angles can now also be obtained.

In the second calibration mode, analogous to the first calibration mode, radar echoes are detected separately for each antenna element, and thus, for each elevation channel, and are digitized and stored without the interposition of digital beamforming. These digitized radar data are then transmitted to a ground station on the surface of the Earth for further processing. As in the first calibration mode, further processing starts with a range compression for the signals of each elevation channel. In contrast to the first calibration mode, the range-compressed data are then transformed into the range Doppler domain. In other words, a frequency decomposition in the Doppler frequency spectrum is carried out, wherein this Doppler frequency spectrum is caused by the Doppler effect resulting from the emission of radar pulses during a movement in the azimuth direction.

After range compression and decomposition in the Doppler frequency spectrum, digital radar signals $u_i(\tau, f_D)$ are obtained which depend on both the range position (expressed by the time $\tau$) and the Doppler frequency $f_D$. In order to determine therefrom calibrated coefficients for digital beamforming, it is assumed that the signals from different antenna elements $u_i(\xi, f_D)$ and $u_j(\tau, f_D)$ are scaled functions of the same scatterer, i.e. they are related to each other via complex relative weights $a_{ji}(r, f_D)$. In order to determine these complex weights, first a mutually independent noise $n(\tau, f_D)$ is specified within the signal of each antenna element. This noise may be determined based on appropriate modelling or may have been obtained from a measurement in which the strength of the signals received by the radar device is determined without the emission of a radar pulse. In this way, the following expressions are obtained for the signals $u_i(\tau, f_D)$ and $u_j(\tau, f_D)$ of the respective antenna elements:

$$u_i(\tau,f_D)=u(\tau,f_D)+n_i(\tau,f_D)$$

$$u_j(\tau,f_D)=a_{ji}(\tau,f_D)\cdot u(\tau,f_D)+n_j(\tau,f_D)$$

The complex weights $a_{ji}(\tau, f_D)$ can then be obtained by cross-correlating the signals $u_j(\tau, f_D)$ and $u_i(\tau, f_D)$ as follows:

$$a_{ji}(\tau, f_D) = \frac{E[u_j(\tau, f_D) \cdot u_i^*(\tau, f_D)]}{E[|u_i(\tau, f_D)|^2] - E[|n_i(\tau, f_D)|^2]}$$

The expectancy value $E[\ ]$ is here approximated by averaging over a local neighborhood in the range Doppler space ($\tau$, $f_D$). The above weights $a_{ji}(\tau, f_D)$ can then be used in a suitable way to determine the coefficients for a digital beamforming. Usually, such weights are taken into account in known methods for coefficient determination, but now these weights have been determined by a novel calibration. As a result, calibrated coefficients for the digital beamforming are obtained, for which the weights $a_{ji}(\tau, f_D)$ were taken into account.

Different methods were used to determine the coefficients of the digital beamforming in the first and second calibration modes. However, these methods are interchangeable between the calibration modes. In other words, the first calibration mode may use the coefficient determination of the second calibration mode and vice versa.

Figure 2:
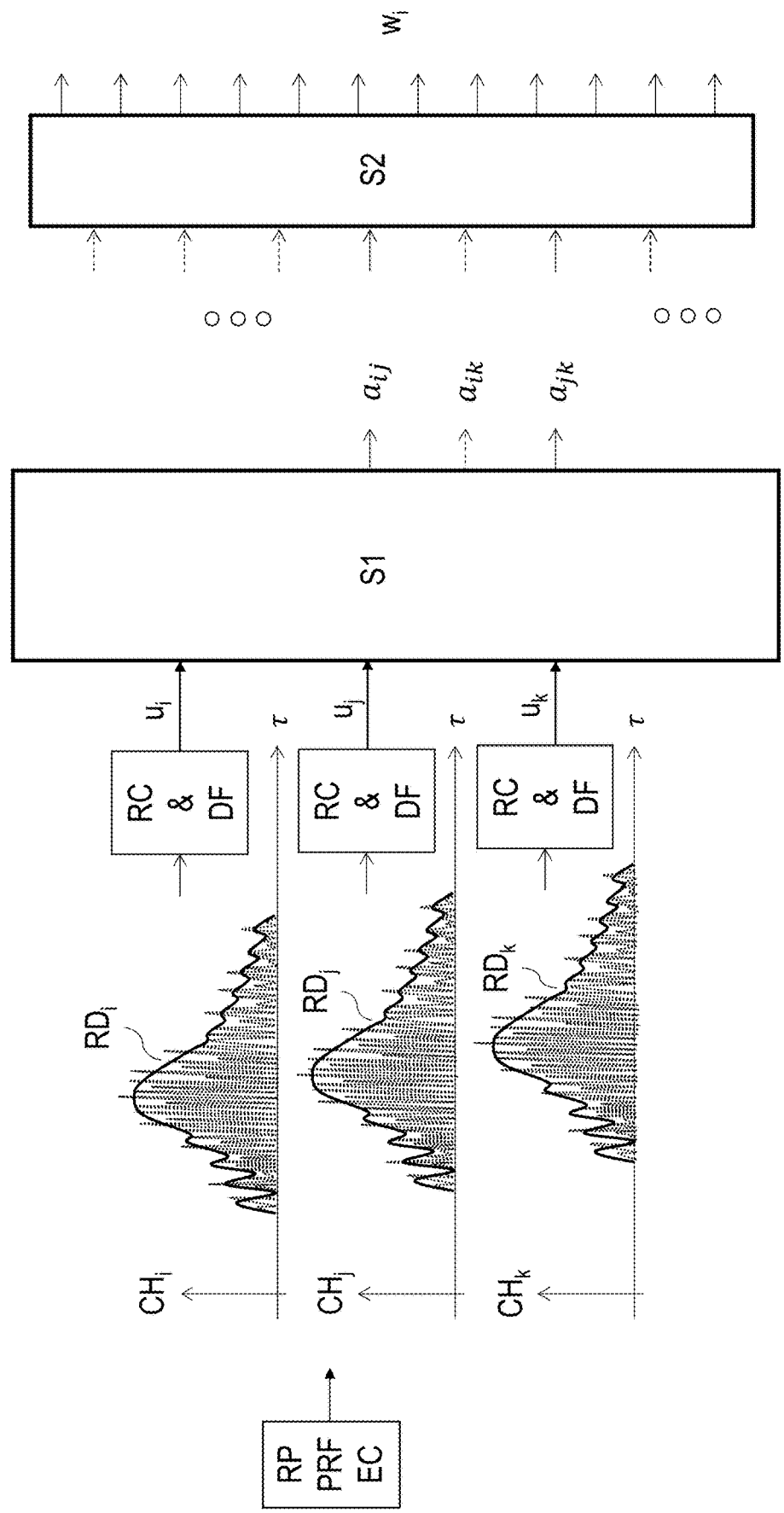
FIG. 2 is a schematic illustration of the implementation of an embodiment of the method according to an example embodiment of the present disclosure.

FIG. 2 again shows an example of the second calibration mode just described. Here, a radar device is considered which includes a reflector antenna. In the calibration mode, radar pulses RP are transmitted at a specified pulse repetition frequency PRF by subsets of antenna elements 2 of the array, and the corresponding radar echoes EC are received by all antenna elements of the array. As explained above, with a reflector antenna, by transmitting only via subsets of antenna elements it is ensured that radar echoes from different radar pulses do not arrive simultaneously at the array. The echo signals of each individual antenna element or receiving channel are detected separately and, after digitization, are stored directly without the interposition of digital beamforming, thereby obtaining digitized radar data for each receiving channel. As an example, FIG. 2 shows the radar data for three antenna elements or receiving channels $CH_i$, $CH_j$ and $CH_k$. The corresponding radar data are designated with $RD_i$, $RD_j$ and $RD_k$.

The radar data of the individual antenna elements are transmitted to a ground station, where further processing is carried out. This further processing includes the range compression described above, which is designated with RC in FIG. 2, and the decomposition in the Doppler frequency spectrum described above, which is designated with DF in FIG. 2. In this way, the corresponding range-compressed and frequency-decomposed signals $u_i$, $u_j$ and $u_k$ are obtained for each receiving channel. In accordance with step S1, these signals are then further processed as described above so that relative weights are obtained, wherein the weights $a_{ij}$, $a_{ik}$ and $a_{jk}$ are given as examples. With these weights, coefficients $w_i$ of a digital beamforming are now determined in a step S2 in a manner known per se.

The example embodiments of the-present disclosure described above have a number of advantages. In particular, it is possible to calibrate an SAR radar system in orbit in a suitable manner without using calibration targets. In a corresponding calibration mode, radar signals are detected which do not exhibit any range ambiguities. This can be achieved by a low pulse repetition rate or by emitting radar radiation towards a reduced area of the surface of the Earth. In the calibration mode, the received radar signals of all antenna elements are recorded without any interposition of digital beamforming. This data can then be used to easily determine calibrated parameters of the SAR radar system and in particular calibrated coefficients for a digital beamforming.

The invention claimed is:

1. A method for remote sensing of the surface of the Earth by means of a synthetic aperture radar (SAR) device comprising:
   providing a flying object configured to move in an azimuth direction above the surface of the Earth, wherein the radar device includes an array of antenna element;
   transmitting radar pulses; and
   receiving radar echoes of said radar pulses (RP) reflected at the surface of the Earth, wherein the radar device is configured such that, in an SAR normal operating mode for obtaining SAR images, simultaneously a plurality of radar echoes from different radar pulses are received and are separated from one another by means of digital beamforming,
   calibrating the transmitted radar pulses and radar echoes such that the transmission of the radar pulses is carried out with a predetermined pulse repetition rate so that only echo signals of a single radar echo are received by all antenna elements of the array at the same point in time;
   recording the radar echoes in a plurality of receiving channels, wherein a different antenna element is assigned to a respective receiving channel, and in the respective receiving channel the echo signals received by the assigned antenna element are digitized and directly stored independently of the other receiving channels thereby obtaining digitized radar data for each receiving channel; and
   processing the digitized radar data of the respective receiving channels to determine a set of calibrated parameters of the radar device for the SAR normal operating mode.

2. The method according to claim 1, wherein the transmitting step further includes that all antenna elements of the array simultaneously transmit radar radiation at the predetermined pulse repetition rate, wherein the predetermined pulse repetition rate is reduced in comparison to the pulse repetition rate of the SAR normal operating mode, so that radar echoes of different radar pulses never simultaneously arrive at the array.

3. The method according to claim 1 wherein the transmitting step further includes that at any time of transmission, radar radiation is directed via the radar device onto an area of the surface of the Earth which is reduced in size in comparison to the SAR normal operating mode, so that radar echoes of different radar pulses never simultaneously arrive at the array of antenna elements.

4. The method according to claim 1, further comprising processing the digitized radar data of each receiving channel wherein the data are subjected to a range compression for the radar echo of a respective radar pulse, thereby obtaining a plurality of digital radar signals for the respective radar pulse, wherein for the corresponding radar echo at least one digital radar signal is present for a respective range position out of a plurality of range positions.

5. The method according to claim 4, wherein the digitized radar data of a respective receiving channel for the radar echo of a respective radar pulse are subjected to a range compression without carrying out any frequency decomposition of the digitized radar data in the Doppler frequency spectrum of the radar echo, thereby obtaining for a respective range position a single digital radar signal for the corresponding radar echo, wherein the Doppler frequency spectrum is caused by the movement of the flying object in the azimuth direction.

6. The method according to claim 4, wherein the digitized radar data of a respective receiving channel for the radar echo of a respective radar pulse are subjected to a range compression, wherein additionally a frequency decomposition of the digitized radar data in the Doppler frequency spectrum of the radar echo is carried out, thereby obtaining for a respective range position a plurality of digital radar signals at different Doppler frequencies for the corresponding radar echo, wherein the Doppler frequency spectrum is caused by the movement of the flying object in the azimuth direction.

7. The method according to claim 1, wherein processing the digitized radar data to determine the set of calibrated parameters includes calibrated coefficients for combining received echo signals of individual antenna elements during the digital beam forming in the SAR normal operating mode for obtaining SAR images.

8. The method according to claim 7, wherein the processing step further includes determining at least one covariance matrix during the determination of the calibrated coefficients for each case of a plurality of range positions, the entries of which are assigned to pairwise combinations of receiving channels, wherein the entries of the covariance matrix are obtained by summing over the radar echoes from a plurality of radar pulses the product of two digital radar signals for the receiving channels of the pairwise combination assigned to the respective entry, wherein the entries of the complex-conjugate of the eigenvector of the covariance matrix with the largest eigenvalue are used as weights for combining the digital radar signals for the radar echo of a respective radar pulse at a respective range position, thereby obtaining a digital target radar signal, based on which the calibrated coefficients of the digital beamforming are determined.

9. The method according to claim 8 further comprising calculating a corrupted signal, in which range ambiguities due to the simultaneous reception of radar echoes of different radar pulses are modelled by a superposition of time-shifted copies of digital radar signals of the respective receiving channel, wherein the calibrated coefficients of the digital beamforming are weights of a weighted sum of the corrupted signals of all receiving channels and are determined by means of an optimization with the optimization objective of a smallest possible difference between the digital target radar signal and the weighted sum.

10. The method according to claim 7 further comprising calculating at least one set of weights for a respective range position, wherein the weights of a respective set describe the relative ratio of the digital radar signals of the different antenna elements of the array to one another, and wherein the calibrated coefficients of the digital beamforming are determined based on the at least one set of weights.

11. The method according to claim 1 wherein, the SAR normal operating mode for obtaining SAR images, for which the set of calibrated parameters is determined, uses radar pulses having a predetermined bandwidth, wherein the bandwidth of the radar pulses in the calibration mode is less than the predetermined bandwidth.

12. The method according to claim 1 further comprising transmitting the digitized radar data from the flying object to a ground station on the surface of the earth, where the set of calibrated parameters is determined.

13. A synthetic aperture radar device for remote sensing of the surface of the Earth, comprising:
an array of antenna elements configured to transmit radar pulses in a transmitting operation and to receive radar echoes of the radar pulses reflected on the surface of the Earth in a receiving operation, wherein the radar device is configured such that in an SAR normal operating mode for obtaining SAR images a plurality of radar echoes from different radar pulses are received simultaneously and are separated from one another by means of digital beamforming,
wherein the synthetic aperture radar device is further configured to carry out a calibration mode in which,
the transmission of the radar pulses in the transmitting operation is carried out with a predetermined pulse repetition rate so that only echo signals of a single radar echo are received by all antenna elements of the array at the same point in time in the receiving operation;
in the receiving operation, the echo signals are recorded in a plurality of receiving channels, wherein a different antenna element is assigned to a respective receiving channel, and in the respective receiving channel the echo signals received by the assigned antenna element are digitized and directly stored independently of the other receiving channels, thereby obtaining digitized radar data for each receiving channel; and
the digitized radar data of the respective receiving channels are further processed to determine a set of calibrated parameters of the radar device for an SAR operating mode for obtaining SAR images.

14. The synthetic aperture radar device according to claim 13, wherein the synthetic aperture radar device is configured such that all of the antenna elements of the array simultaneously transmit radar radiation at the predetermined pulse repetition rate, wherein the predetermined pulse repetition rate is reduced in comparison to the pulse repetition rate of the SAR normal operating mode, so that radar echoes of different radar pulses never simultaneously arrive at the array.

* * * * *